United States Patent [19]

Mitchell et al.

[11] 3,769,038
[45] Oct. 30, 1973

[54] FAT SPONGE

[75] Inventors: William A. Mitchell, Lincoln Park, N.J.; William C. Seidel, Monsey, N.Y.

[73] Assignee: General Foods Corporation, White Plains, N.Y.

[22] Filed: Mar. 12, 1971

[21] Appl. No.: 123,826

Related U.S. Application Data

[63] Continuation-in-part of Ser. No. 612,094, Jan. 27, 1967, abandoned.

[52] U.S. Cl. .................. 426/363, 426/380, 426/385
[51] Int. Cl. ........................... A23d 5/00, A23l 1/22
[58] Field of Search ..................... 99/118 R, 118 P, 99/123, 140, 144

[56] References Cited
UNITED STATES PATENTS

| | | | |
|---|---|---|---|
| 1,431,938 | 10/1922 | Dunham | 99/118 |
| 2,170,954 | 8/1939 | Stange | 99/140 |
| 2,471,434 | 5/1949 | Kimball et al. | 99/144 |
| 2,567,815 | 9/1951 | Kipuis | 99/94 |
| 2,616,604 | 11/1952 | Folsom | 99/71 X |
| 2,913,342 | 11/1959 | Cameron et al. | 99/123 |
| 3,128,208 | 4/1964 | Zeithlin et al. | 127/71 X |
| 3,396,035 | 8/1968 | Kessinger | 99/94 |
| 3,436,224 | 4/1969 | Bode | 99/31 |

FOREIGN PATENTS OR APPLICATIONS 28,926  1/1926  Australia............................ 99/71

OTHER PUBLICATIONS

Ken et al., Chem. & Ind. of Starch, Acad. Press Inc. N.Y. 1960, page 632
Flosdorf, Freeze-Drying, Reinhold Publ. Corp., N.Y. 1949, pages 15, 16
Merory, Food Flavorings, Avi Publ. Co. Inc., Westport, Conn. 1960, pages 232, 233
Nozuick et al., Powdered Fat Emulsions Tailored to Functions, 4 pages, Reprinted from Food Engineering, June 1965

*Primary Examiner*—Joseph M. Golian
*Attorney*—LeFever, Quillinan and Hubbard

[57] ABSTRACT

A starch-fat sponge is prepared by intimately mixing fat, water, and pregelatinized starch, thereby forming an emulsion, and freeze-drying the emulsion. The so prepared starch-fat sponge can retain up to 92 percent fat, whether it is a liquid or a solid fat. This dry fat-containing starch sponge product, after being dried, can be comminuted and mixed with various powdered condiments, such as garlic, onions, and acetic acid to form a powdered seasoning that can be sprinkled by means of a shaker onto steaks or vegetable salads.

7 Claims, No Drawings

FAT SPONGE

This application is a continuation of U.S. Pat. No. 612,094, filed Jan. 27, 1967 and now abandoned.

BACKGROUND OF THE INVENTION

Sponge-like starch products have been made by freezing and thawing a cooked starch, expressing most of the water from the starch and drying the starch to remove the remaining water (Ling et al., Journal of the Chemical Society, [London] vol. 123, pp. 2,666–2,888, 1923). These starch sponges have good water absorbency, however they do not absorb fat to any great degree. On the other hand, it is well known that fats can be emulsified and encapsulated in starch materials. This expedient has been found to be very useful in preparing dry food preparations which preferably have a high fat content, especially where it is desirable that the dry food mix be free-flowing.

Starch encapsulated fats have been used in powdered salad dressing mixes that are prepared by merely mixing the powdered preparation with water. The Kimball et al. U.S. Pat. No. (2,471,434) discloses such a dry salad dressing preparation, which need only be mixed with water prior to use. Oil, one of the essential ingredients of the salad dressing, is emulsified and encapsulated in starch to form a dry powdered shortening which is free flowing. In use, the dry salad dressing of Kimball et al. is mixed with an aqueous liquid to form a creamy salad dressing. The salad dressing of Kimball et al. is difficult to disperse in water unless sugar is added to the mix. The powdered shortening taught by Kimball et al. is unsuitable for use in clear-type salad dressings since it contains a hydrogenated fat and at least 25 percent by weight starch which makes the prepared product cloudy. Thus, although this hydrogenated fat-containing product can be used to prepare satisfactory cream type dressings, as disclosed by Kimball et al., it is generally unsuitable for use in light oil-containing salad dressings, such as Italian salad dressing, where the clarity of the product is important. Again, where it is desired to provide a large amount of a light oil to food such as meats and potatoes for seasoning purposes, the Kimball et al. dried powdered shortening is not suitable because it would introduce a moderate amount of slimy starch with the fat. Also, fat is not so easily released in high starch-containing compositions, and products in which such compositions are used generally do not have a pleasing texture and appearance.

ADVANTAGES & OBJECTS

A method has now been discovered for preparing a fat containing starch compound which will hold a very high proportion of fat in a dry powdered form, and which will readily release the fat when added to foodstuffs such as, meat, poultry, vegetables etc. This compound, a starch-fat sponge, has many advantages over the prior art fat-starch emulsions. For example, this product gives much better results in preparing clear salad dressings than prior art starch-fat emulsions, since it introduces considerably less starch into the salad dressing and consequently the salad oil is less cloudy. The instant product has the further advantage that once the sponge is formed all or any portion of the fat can be expressed by simple mechanical means and replaced with a different type fat. Because of this property the instant fat sponge is also suited for introducing volatile flavor oils such as lemon oil, coffee oil etc. into dry foodstuffs in the powdered form.

The fat containing starch sponge of the instant invention has further application in the preparation of a seasoning which can be used to add a considerable amount of fat to a foodstuff i.e., a high fat containing seasoning can be prepared in the powdered form for use in basting meats and poultry. Since the starch-fat sponge contains up to 92 percent fat, very little starch would be added to the meat with the oil, thereby avoiding the formation of a slimy surface. Furthermore, this fat can be in the form of a solid or a liquid. Heretofore, it has not been possible to incorporate high amounts of liquid fat in starch-fat emulsions. The powdered seasoning could be easily dispensed from a shaker onto a meat product. When added in this way the fat is easily released, resulting in a product having a pleasing appearance and texture.

The starch-fat sponge of the instant invention can be used in the preparation of new products. For instance, the fat-containing starch sponge can be combined with seasonings such as acetic acid, powdered onions and garlic to produce a salad seasoning which can be sprinkled directly onto moistened vegetables. The oil and seasoning is released as the dry powder touches the moistened vegetables. This is a new concept in salad seasonings since there is, at present, no commercially available fat-containing seasoning that is not in a liquid or creamy form. Thus, it is no longer necessary to prepare or to have on hand a liquid or creamy type salad dressing each time a meal which includes a vegetable salad is served.

Accordingly, it is the object of the present invention to provide a method of preparing an improved dry starch-fat product. It is another object to provide an improved starch-fat sponge having a high fat content. It is a third object to provide a starch-fat sponge which can be used as a flavor fixative to carry volatile flavor oils in a dry form. It is a fourth object of the invention to provide a method of preparing a powdered fat-containing vegetable and meat seasoning. It is a still further object to provide a fat-containing seasoning which is useful for basting meats and poultry. It is another object of the invention to provide a dry salad seasoning which can be directly dispensed onto moistened vegetables. These and other objects of the present invention will become apparent from the following description and examples.

DESCRIPTION

In the present discussion the term starch-fat sponge is used to describe a starch matrix containing large amounts of fatty material. Fatty material, as the term is used herein, includes glycerides, esters of monohydric alcohols, mineral oils and waxes, synthetic emulsifiers, citrus oils and the like. The preferred fatty materials are the triglycerides. The starch-fat sponge of the present invention is preferably prepared by adding pregelatinized starch and fat to water and blending for a time sufficient to form an emulsion. The emulsion is then frozen and freeze-dried, yielding a product that is dry to the touch which can be ground into a free-flowing powder. The emulsion can also be prepared by adding fat and ungelatinized starch or flour to water, cooking the mixture to gelatinize the starch and then intimately mixing the mixture to form an emulsion. However when using this method there is little control over the gelatinization and poor emulsions might be obtained, resulting in an inferior starch-fat sponge. Therefore, it is preferable to gelatinize the starch or flour under controlled conditions to obtain the correct degree of swelling prior to preparing the fat emulsion. The dried fat sponge can contain as much as 92 percent fat, and preferably contains from 75 to 92 percent fatty material, and can be prepared in any general shape. For example, if the starch-fat emulsion is dried in pans the resulting dry product will be in the shape of the pan used. The sponge now has a mushroom-like texture and can be easily transported in bulk. The high fat-containing sponge can be used in this form to add fat to foods or it can be ground to a free flowing powder. The type of starch used in the product can be any of the common starches and flours, such as cereal or root starches or corn or wheat flour. The preferred starch is corn since it yields a product having superior texture and quality. The melting point of the fat used in the product can vary over a wide range and includes those fats which are normally liquid at room temperature, commonly known as oils, as well as the higher melting point fats including hydrogenated oils. The physical properties of the product, such as density and texture, can be changed by using different starches and/or fats or by changing the process conditions. When a product is made according to the present invention it will have a dry feel and will be free flowing regardless of the melting point of the fat used.

The fat used to make the emulsion may contain various ingredients, such as flavor oils. Alternatively, if it is desired, the fat can be expressed from the sponge-like carrier and replaced by another fat or flavor oil. This expedient is particularly useful for incorporating volatile materials into the starch sponge which could not satisfactorily be introduced prior to the drying step due to their high volatility. The expression of the fat from the sponge can be accomplished by the usual physical methods. Other methods of removing the oil from the starch sponge, such as heating the fat-containing starch sponge, can also be employed. Upon heating, the fat slowly leaves the matrix. Various ingredients can be introduced into the starch sponge with the substituted fat or flavor oil, such as spices or aromatic substances which influence the aroma of the product. In adding the flavor oil to the defatted starch sponge it is only necessary to mix the sponge-like material with the oil. Although the oil will be quickly absorbed the starch sponge will retain its compressed form and can have a nut-like texture.

The fat-containing starch sponge can be comminuted by cutting it or shearing it into a coarse powder. The resulting powdery product still retains its dry appearance and feel, and is free flowing. In this form the product is very useful for adding small amounts of oil to a foodstuff in a uniform manner, such as by dispensing the powdered material from a shaker container.

A new seasoning product can be prepared from the fat-containing sponge by merely blending it with various seasoning ingredients, such as powdered onions and garlic, salt etc. This seasoning can be applied to meats and vegetables which are being cooked, such as broiled steaks, where it is desired to add an oil for basting or to provide a glazed finish. A new dry vegetable salad seasoning can be made by adding additional dry ingredients, such as dry acetic acid and powdered mustard to the above described powdered seasoning. The resulting salad seasoning can be applied directly to moistened vegetables without the necessity of being mixed with liquid ingredients. The presence of even a small amount of moisture causes the release of the fat from the dry emulsion.

In order that the invention can be better understood the following examples will serve to illustrate specific applications of the invention.

EXAMPLE I

A fat-containing starch sponge was prepared in the following manner. A 14 gm. portion of pregelatinized corn starch was added to 200 mls. of water in a bowl of a Waring Blendor and mixed at high speed for one minute. To the mixture 100 mls. of Wesson oil was added and the resulting mixture was mixed for 1 minute at high speed. The resulting emulsion was poured into trays and frozen with dry ice. The trays were placed in a laboratory freeze-dryer and dried, yielding a low density chunky product that had a dry appearance and feel and contained about 87 percent fat.

EXAMPLE II

A portion of (5 gms) of the sponge product obtained in Example I was pressed firmly between two glass plates causing a considerable amount of the fat to be expressed. To the compressed starch sponge was added 5 cc. of lemon oil. The lemon-oil was absorbed by the starch-fat sponge. The resulting product was dry to the touch, but had not expanded to the original size of the sponge. The sample was stored for several months in a glass jar. From time to time it was examined and found to contain good quality lemon oil flavoring which could be released by dropping pieces of the product into water.

EXAMPLE III

A sample was prepared according to the procedure of Example II except that acetic acid in Crisco fat was substituted for the lemon oil. The sample was stored for several months in a glass jar. It was examined from time to time and was found to retain most of the acetic acid.

EXAMPLE IV

A salad seasoning was prepared in the following manner. A fat-containing-starch sponge was made and ground in the bowl of a Waring Blendor so that it passed through a 20 mesh screen. To 5 gms. of this material 2 cc. of glacial acetic acid was added, producing a dry powder with a strong acetic acid odor. The dry powder containing the acid was mixed with an equal weight of dry cheese garlic dressing and the mixture was placed in a capped shaker bottle. The resulting coarse, powdered material flowed easily and when dispensed onto moistened lettuce released oil and acid to produce a good-tasting salad dressing.

Although the present invention has been described with particular reference to specific examples, it should be understood that the invention is not limited thereto. It is contemplated that new synthetic products can be made from the fat-containing starch sponge, such as nuts and coconut and, accordingly, reference should be had to the appended claims for the definition of the invention.

We claim:

1. A method for preparing a dry, compressible starch-fat sponge material, containing from 75 to 92 percent by weight triglyceride material and from which a portion of the triglyceride may be removed, comprising the steps of:
  a. preparing an aqueous emulsion consisting essentially of water, triglyceride material and gelatinized starch,
  b. freezing the aqueous emulsion,
  c. freeze-drying the frozen emulsion.

2. The method as set forth in claim 1 wherein the starch-fat sponge is comminuted and blended with seasoning ingredients.

3. The method according to claim 1 wherein the starch is gelatinized before mixing with the triglyceride material.

4. A method of preparing a dry, compressible sponge material comprising the steps of:
  a. preparing an aqueous emulsion consisting essentially of water, triglyceride material and gelatinized starch,
  b. freezing the aqueous emulsion,
  c. freeze-drying the frozen emulsion, thereby forming a dry, starch-fat sponge,
  d. removing a portion of the triglyceride from the dried starch-fat sponge, and then
  e. absorbing a volatile flavor oil with the starch sponge.

5. A method according to claim 4 wherein the triglyceride material is removed by compressing the dry starch-fat sponge.

6. A method according to claim 4 wherein the starch is gelatinized before mixing with the triglyceride material.

7. A method according to claim 4 wherein the freeze-dried emulsion contains from 75 to 92 percent triglyceride material.

* * * * *